Oct. 4, 1966　　　　D. W. ZIMMERMAN　　　　3,276,747
SAFETY DEVICE FOR ROTATABLE MEMBERS
Filed Sept. 11, 1964　　　　　　　　　　　　　2 Sheets-Sheet 1
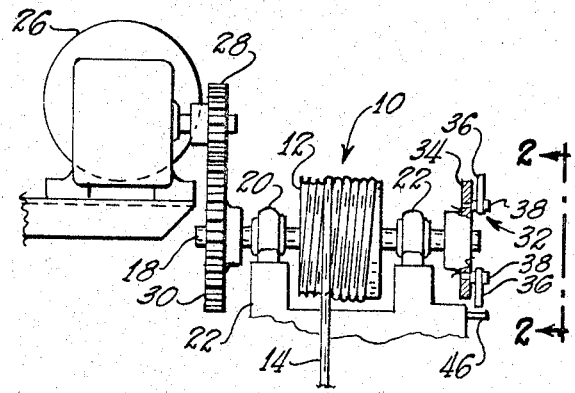
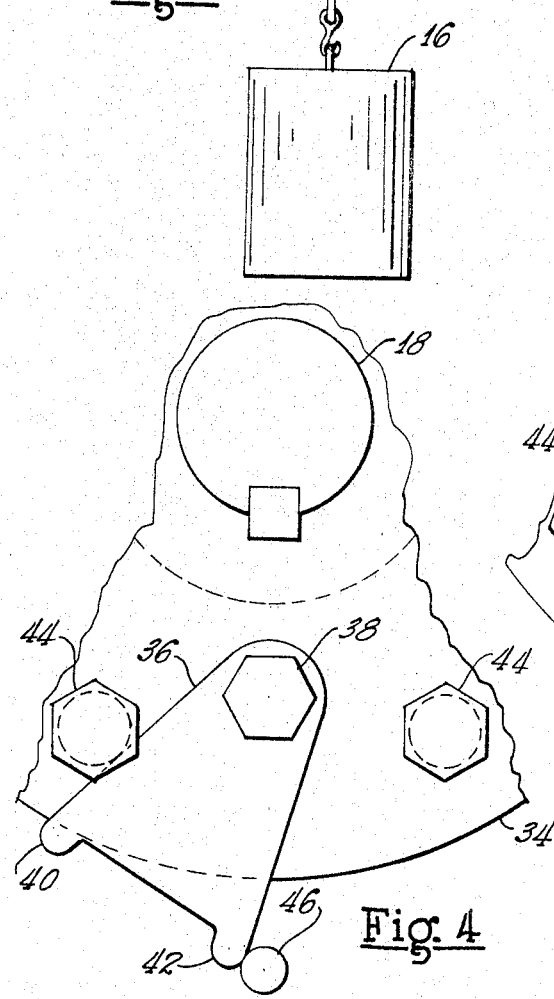
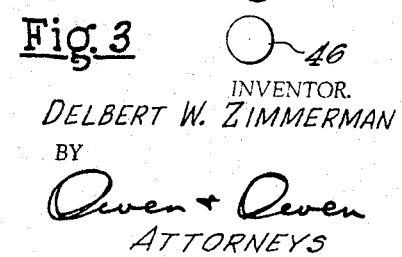
INVENTOR.
DELBERT W. ZIMMERMAN
BY
Owen + Owen
ATTORNEYS INVENTOR.
DELBERT W. ZIMMERMAN
BY
Owen + Owen
ATTORNEYS 3,276,747
SAFETY DEVICE FOR ROTATABLE MEMBERS
Delbert W. Zimmerman, 4860 Far Hill Road,
Toledo, Ohio
Filed Sept. 11, 1964, Ser. No. 395,841
7 Claims. (Cl. 254—173)

This invention relates to a safety device for stopping movement of a rotatable member if the acceleration of the member is excessive, and more particularly to a safety device to stop rotation of a cable drum in the event of the malfunctioning of components thereof, causing acceleration of the drum above a predetermined rate.

A safety device according to the invention includes a plurality of pivotable dogs mounted for rotation with the cable drum or other rotatable body with which they are used. A stop member is located in a predetermined position with respect to the dogs which engage the stop member when the acceleration of the rotatable body is sufficient. The new safety device has a number of advantages over those heretofore known. The device is extremely reliable, not employing any springs or other resilient components which are subject to failure. The pivotable dogs also continually pivot during operation of the hoist or other equipment with which the device is used to prevent the dogs from possible rusting, clogging, or otherwise freezing, and thereby be inhibited from moving and operating at the time they are needed. The new safety device also is adaptable for many applications, including conventional hoists, balancing hoists of the type shown in Powell Patent 2,710,107 or Powell application Serial No. 315,873, tensioning devices, elevators, and other equipment having movable components which are subject to sudden acceleration due to malfunctioning of components of the equipment. The safety device also is effective to stop movement of the rotatable body under such conditions, regardless of the direction in which the body rotates. In addition, the safety device is both inexpensive to manufacture and requires minimum maintenance.

It is, therefore, a principal object of the invention to provide a safety device having the advantages outlined above.

Numerous other objects and advantages of the invention will be apparent from the following detailed description of a preferred embodiment thereof, reference being made to the accompanying drawing, in which:

FIG. 1 is a view in elevation, with parts broken away and with parts in cross section, of a hoist having a safety device according to the invention;

FIG. 3 is a detailed view of a portion of the safety device of FIG. 2 in a slightly different position; and, FIG. 4 is a detailed view of the part of the safety device of FIG. 3 when accelerating above a predetermined rate.

Figure 2:
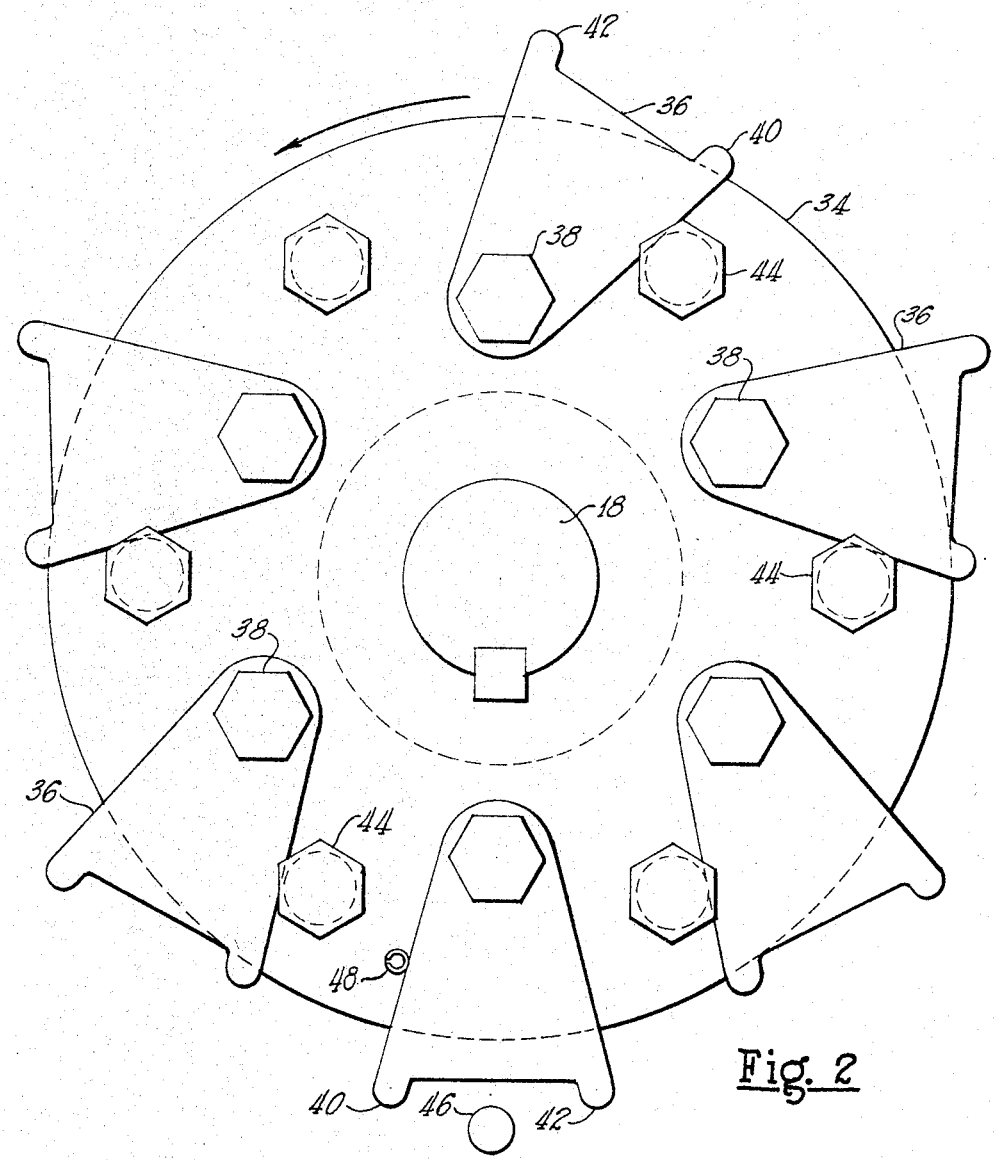
FIG. 2 is an enlarged elevational view of the safety device, taken along the line 2—2 of FIG. 1.

For purposes of illustration, the safety device according to the invention is shown in connection with a hoist in FIG. 1. It is not, however, intended to be limited to this particular application. Referring to FIG. 1, a hoist 10 includes a cable drum 12 upon which is wound and unwound a cable 14 for supporting, raising, and lowering a load 16. The drum 12 is mounted on a shaft 18 rotatably supported by two bearing blocks 20 and 22 located on a stationary supporting member or platform 24. The shaft 18 can be driven by a motor and reducer 26 through gears 28 and 30 to rotate the drum 12 and to raise and lower the load 16.

A safety device indicated at 32 at the right end of the hoist 10 is shown in more detail in FIG. 2. In this instance, the safety device includes a rotatable disc 34 which is suitably affixed, as by a key and keyway, to the shaft 18 and rotates with the shaft 18 and the drum 12. A plurality of generally triangular shaped dogs 36 are spaced around the disc 34 and are pivotally mounted thereon by pivot members or bolts 38. The bolts 38 are circumferentially spaced at equal intervals around the disc 34 and are equally spaced from the shaft 18. Each of the dogs 36 preferably includes two spaced projections or ears 40 and 42 at the outer corners with the two ears being symmetrically spaced with respect to a radial line through the pivot bolt 38 when the dog extends radially outwardly, as when acted upon by sufficient centrifugal force, or when hanging vertically by gravity with the center of the shaft 18 and the center of the pivot bolt 38 lying in a vertical line.

The free pivotal movement of the dogs 36 is limited by a plurality of stop pins or means 44 located between each pair of adjacent dogs. The stop pins 44 and the projections 40 and 42 are arranged such that when one of the dogs 36 engages one of the stop pins 44, the opposite projection 40 or 42 will be substantially radially aligned with the center of the pivot bolt 38 and the center of the shaft 18, as shown in FIG. 4. Hence, at the maximum limits of pivotal movement, either the projection 40 or the projection 42 will extend outwardly from the shaft 18 substantially its maximum distance.

A stop 46 in the form of a rod or other suitable member is affixed to the stationary member 24 below the plane of rotation of the dogs 36. The stop 46 is positioned to be engaged by one of the projections 40 or 42 when the dog 36 is in one of its extreme pivotal positions but is otherwise free or clear of the projections.

When the hoist drum 12 is rotating under normal operating conditions for raising or lowering the load, the acceleration or velocity of the drum will be insufficient to cause the dogs to engage the stops 46. In such an instance, the dogs 36 will hang freely as the disc 34 rotates and the dogs move toward the lower vertical position. The projections 40 and 42 then tend to "walk" over the stop 46 and remain out of contact with it. With the disc rotating counterclockwise, as shown, the first projection 42 of each dog will clear the stop 46 as the dog moves from the "8 o'clock" position of FIG. 2 to the "7 o'clock" position of FIG. 3 and finally to the "6 o'clock" position of FIG. 2. Similarly, as the dog 36 progresses from the "6 o'clock" position to the "4 o'clock" position of FIG. 2, the rear projection 40 will clear the stop 46 in the same manner as the projection 42. As the dog 36 then moves further counterclockwise, it will remain against the rearward stop pin 44 from approximately the "4 o'clock" position to somewhat beyond the "12 o'clock" position, after which a vertical line through the center of gravity of the dog 36 will pass to the left of the pivot bolt 38 and cause the dog to swing against the forward stop pin 44 by the time it reaches the "10 o'clock" position. The dog will then continue downwardly, resting on the stop pin 44, and finally swinging free of the forward stop pin 44, by virtue of gravity as it reaches approximately the "7 o'clock" position. It will then hang freely of the stop pin 44 and clear the stop member as it moves to the "5 o'clock" position.

The cable drum 12 can suddenly accelerate beyond a predetermined rate if, for example, the gear 28 or 30 should be stripped, enabling substantial free fall of the load 16. Excessive acceleration can also happen in the opposite direction of rotation, if the motor 26 is operated excessively suddenly in raising the load. This might occur, for example, if the motor 26 has two or more speeds and a higher speed is accidentally used with a light load. In any event, when the drum 12 and the disc 34 accelerate beyond the predetermined rate, the dogs 36 are thrown rearwardly against the rear stop pins 44 so that the dogs in the "10 o'clock," "8 o'clock," and "6 o'clock" positions of FIG. 2 will assume the same positions as the dogs shown in the "4 o'clock," "2 o'clock," and "12 o'clock" positions. The lower dog 36 would then be against the rear stop pin 44 with the forward projection 42 extending substantially radially outwardly from the pivot bolt 38, as shown in FIG. 4. In this position, the dog extends sufficiently far out to engage the stop 46 and abruptly halt the rotation of the drum, the dog 36 then being engaged between the stop 46 and the stop pin 44.

While the pivotable dogs are shown mounted on the disc 34, which, with the bolts 38, constitutes means for supporting the dogs equally circumferentially around and equally spaced from the shaft 18, the dogs 36 also could be mounted on one end of the drum 12, for example. In addition, while six of the dogs 36 are shown, fewer or more of them may be used, generally being more for larger diameter drums and fewer for smaller ones. Of course, only one dog is absolutely necessary, although a plurality are usually desired. With one dog, rotation of the drum before being stopped can be excessive, and the drum may reach too high a speed before it is stopped by the dog.

Where there is a danger of failure of components and run-away of the drum 12 in only one direction, the dogs can have only one of the projections 40 and 42. Even then, however, the dogs should be approximately symmetrically balanced to prevent the remaining projection from assuming a position too close to the radial one solely by the action of centrifugal force, rather than by acceleration. Also, to enable operation of the safety device in only the one direction, an auxiliary roll pin 48 can be used with each of the dogs 36, only one being shown in FIG. 2, with the pins 48 removably mounted on the disc 34 in the position shown. In this position, the dogs 36 can assume only a radial position when the disc is rotated in a counterclockwise direction, in this instance, regardless of the rate of acceleration thereof. In the radial position, the projections 40 and 42 will clear the stop 46 even though the dogs do not tend to swing under the action of gravity when moving between approximately the "7 o'clock" and "5 o'clock" positions.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. In combination, a rotatable body, a stationary member, a stop on said stationary member, a pivotable dog rotatable with said body, means for pivotally supporting said dog, stop means limiting pivotable movement of said dog, said dog having a first position clearing said stop when said rotatable body rotates at any relatively constant rate of rotation, and said dog having a second position engaging said stop by movement of said dog to the rear relative to said rotatable body when said rotatable body rotates at a predetermined rate of acceleration beyond normal operating conditions.

2. In combination, a rotatable body, a stationary member, a stop on said stationary member, a plurality of pivotable dogs, means for pivotally supporting said dogs and for causing said dogs to rotate with said rotatable body, stop means limiting pivotable movement of said dogs, said dogs having first positions clearing said stop when said rotatable body rotates at any relatively constant rate of rotation, and said dogs having second positions engaging said stop by movement of said dogs to the rear relative to said rotatable body against said stop means when said rotatable body rotates at a predetermined rate of acceleration beyond normal operating conditions.

3. In combination, a rotatable cable drum, a plurality of pivotable dogs, means for freely pivotally supporting said dogs around the axis of rotation of said cable drum for substantially unrestricted pivotal movement, a stationary stop member located in a predetermined position relative to said dogs, stop means for limiting the pivotal movement of said dogs in at least one direction, each of said dogs having a projection positioned to clear said stop member under normal operating motion of said drum with said drum rotating at a relatively constant rate of rotation but pivotable in a direction opposite to the direction of rotation of the drum when the acceleration of the drum exceeds a predetermined rate in the one direction regardless of the rate of rotation of said drum, said dogs then contacting said stop means to move one of said projections into engagement with said stop member to stop rotation of said drum.

4. In combination, a rotatable cable drum, a plurality of pivotable dogs, means for pivotally supporting said dogs around the axis of rotation of said cable drum, a stationary stop member located in a predetermined position relative to said dogs, stop means for limiting the pivotal movement of said dogs in both directions, each of said dogs having a pair of projections positioned to clear said stop member under normal operating motion of said drum but pivotable in a direction opposite to the direction of rotation of the drum when the drum accelerates above a predetermined rate in either direction, said dogs then contacting said stop means to move one of projections of one of said dogs into engagement with said stop member to stop rotation of said drum.

5. A safety device for a hoist having a cable drum and a cable thereon for supporting, raising, and lowering a load, a stationary member on which said cable drum is rotatably supported, and means for applying force to said drum to aid in the raising of the load and resist the lowering of the load, a stop member on said stationary member positioned near the drum, a plurality of pivotable dogs, means for pivotally supporting said dogs at equally circumferentially spaced positions around the drum and equally spaced from the axis of rotation of said drum, each of said dogs having a pair of projections extending outwardly with the projections of each of said dogs symmetrically spaced on opposite sides of a vertical line through the pivot means when the dog extends radially outwardly, stop means to symmetrically limit pivotal movement of each of said dogs with the projections being substantially radially outwardly from the pivot means when the dog is stopped in its maximum pivotal positions, said projections clearing said stop member under normal movement of said drum but engaging said stop member when said drum moves about a predetermined rate to jam the dog between the stop means and the stop member and stop the drum.

6. A safety device for a cable drum and a cable thereon for supporting a load, a stationary member on which said cable drum is rotatably supported, a stop member on said stationary member positioned near the drum, a plurality of pivotable dogs, means for pivotally supporting said dogs at equally circumferentialy spaced positions around the drum and equally spaced from the axis of rotation of said drum, each of said dogs having a pair of projections extending outwardly with the projections of each of said dogs symmetrically spaced on opposite sides of a vertical line through the pivot means when the dog extends radially outwardly, stop means to symmetrically limit pivotal movement of each of said dogs with the projections being substantially radially outwardly from the pivot means when the dog is stopped in its maximum pivotal positions, said projections clearing said stop member under normal movement of said drum but engaging said stop member when said drum moves above a predetermined rate to jam the dog between the stop means and the stop member and stop the drum.

7. A device according to claim 6 including additional stop means on one side of each of said dogs to prevent said dogs from pivoting in a common direction beyond radial positions to prevent said dogs from locking said drum when rotating in one direction.

References Cited by the Examiner

UNITED STATES PATENTS

| | | | |
|---|---|---|---|
| 403,438 | 5/1889 | Nickerson | 188—189 |
| 849,104 | 4/1907 | Breed | 188—189 |
| 1,028,596 | 6/1912 | O'Neill | 188—189 |
| 1,425,291 | 8/1922 | Seib | 188—189 |

SAMUEL F. COLEMAN, *Primary Examiner.*

UNITED STATES PATENT OFFICE
CERTIFICATE OF CORRECTION

Patent No. 3,276,747                      October 4, 1966

Delbert W. Zimmerman

It is hereby certified that error appears in the above numbered patent requiring correction and that the said Letters Patent should read as corrected below.

Column 4, line 58, for "about" read -- above --.

Signed and sealed this 5th day of September 1967.

(SEAL)
Attest:

ERNEST W. SWIDER                      EDWARD J. BRENNER
Attesting Officer                      Commissioner of Patents